(12) United States Patent
Kalkunte et al.

(10) Patent No.: US 9,628,384 B2
(45) Date of Patent: Apr. 18, 2017

(54) ADAPTIVE INDUSTRIAL NETWORK

(71) Applicant: AVAGO TECHNOLOGIES GENERAL IP (SINGAPORE) PTE. LTD., Singapore (SG)

(72) Inventors: Mohan Venkatachar Kalkunte, Saratoga, CA (US); Wael William Diab, San Francisco, CA (US); Yasantha Rajakarunanayake, San Ramon, CA (US); Michael David Johas Teener, Santa Cruz, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 159 days.

(21) Appl. No.: 14/461,073

(22) Filed: Aug. 15, 2014

(65) Prior Publication Data

US 2015/0078200 A1 Mar. 19, 2015

Related U.S. Application Data

(60) Provisional application No. 61/943,046, filed on Feb. 21, 2014, provisional application No. 61/880,035, filed on Sep. 19, 2013.

(51) Int. Cl.
*H04L 12/28* (2006.01)
*H04L 12/721* (2013.01)
(Continued)

(52) U.S. Cl.
CPC .......... *H04L 45/72* (2013.01); *H04L 41/0806* (2013.01); *H04L 45/22* (2013.01);
(Continued)

(58) Field of Classification Search
CPC ....... H04L 45/22; H04L 45/72; H04L 45/302; H04L 41/12; H04L 41/0806; H04L 41/0816
See application file for complete search history.

(56) References Cited

U.S. PATENT DOCUMENTS

| 2002/0075805 A1* | 6/2002 | Gupta | H04L 12/2801 370/235 |
| 2006/0088093 A1* | 4/2006 | Lakaniemi | G10L 19/005 375/240.01 |

(Continued)

*Primary Examiner* — Alex Skripnikov
(74) *Attorney, Agent, or Firm* — Oblon, McClelland, Maier & Neustadt, L.L.P.

(57) ABSTRACT

An environment, such as an industrial environment, may include a control network with multiple network devices. A network device in the control network may have groups of communication ports servicing upstream and/or downstream network traffic. The group of communication ports may have, for example, two communication ports. Transmission parameters of the communication ports may be dynamically configured based on a first network port configuration and a second network port configuration for the first and second communication ports, respectively. The first network port configuration may have different transmission parameters than the second network port configuration. The first network port may forward data packets over the control network according to the first network port configuration, while the second network port may forward data packets to the next hop device utilizing the second network port configuration.

16 Claims, 5 Drawing Sheets

(51) Int. Cl.
*H04L 12/707* (2013.01)
*H04L 12/725* (2013.01)
*H04L 12/24* (2006.01)

(52) U.S. Cl.
CPC ........ H04L 45/302 (2013.01); *H04L 41/0816* (2013.01); *H04L 41/12* (2013.01)

(56) References Cited

U.S. PATENT DOCUMENTS

| | | | | |
|---|---|---|---|---|
| 2007/0268915 A1* | 11/2007 | Zelig | .................... | H04L 12/4625 370/401 |
| 2011/0063979 A1* | 3/2011 | Matthews | ............. | H04L 45/302 370/237 |
| 2012/0016973 A1* | 1/2012 | Haris | .................. | H04L 12/5696 709/220 |

\* cited by examiner

ADAPTIVE INDUSTRIAL NETWORK

This application claims priority to provisional application Ser. No. 61/943,046, filed Feb. 21, 2014, and provisional application Ser. No. 61/880,035, filed Sep. 19, 2013, both of which are incorporated by reference in their entirety.

TECHNICAL FIELD

This disclosure relates to communication in an industrial environment. This disclosure also relates to supporting self-configuration and network overlays in the industrial environment.

BACKGROUND

Rapid advances in sensors, control systems, and manufacturing techniques have led to the worldwide adoption of automated manufacturing techniques for every imaginable product. The manufacturing techniques include automation and process control, and operate over an extreme range of temperature, vibration, electrical and acoustic noise, humidity, and other environmental characteristics. Communication within and across such manufacturing or industrial environments may be difficult due to extreme temperatures, variant levels of dust, moisture, machine noise, chemical hazards, and more.

DETAILED DESCRIPTION

Figure 1:
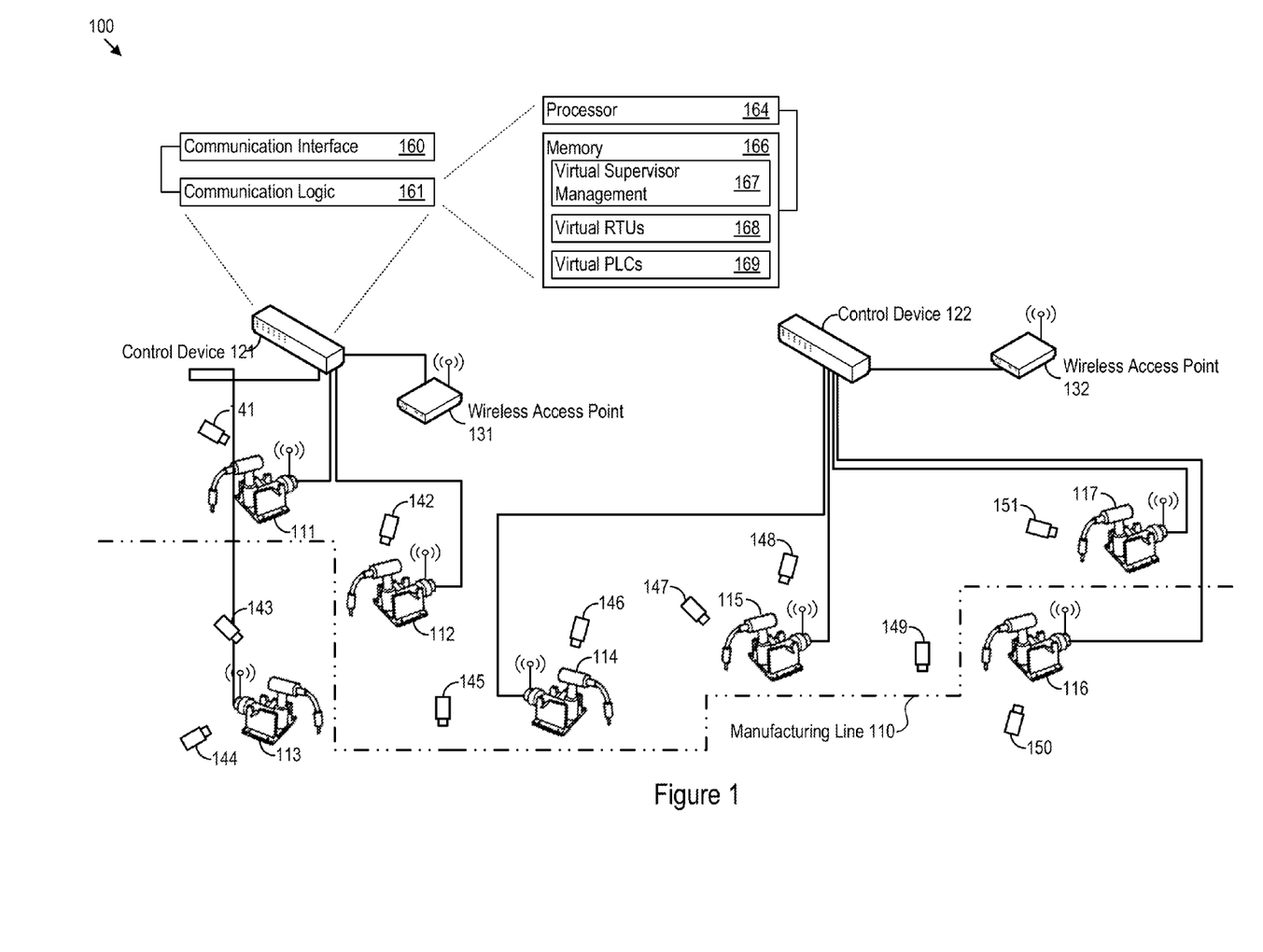
FIG. 1 shows an example of an example industrial environment.

FIG. 1 shows an example of an environment 100, such as an industrial network environment, that supports self-configuration and network overlays. The environment 100 may be any industrial environment, such as a manufacturing assembly line, an industrial materials processing plant, or a factory inventory area. The environment 100 shown in FIG. 1 may be an industrial environment that includes a manufacturing line 110. The environment 100 is not limited to industrial settings, however, and any environment in which the communication features discussed below might be useful is a possibility, such as within a vehicle, a hospital, television broadcasting studio, or a classroom.

The environment 100 may include any number of devices. The exemplary environment 100 in FIG. 1 includes manufacturing devices 111-117, control devices 121 and 122, wireless access points (AP) 131 and 132, and multiple sensors labeled as sensors 141-151. Additional or alternative devices may be present in the industrial environment 100, including, as examples, data servers, actuators, generators, motors, machinery, monitoring devices, computers, management or control systems, environment management devices, analysis systems, communication devices, and any mobile device such as a mobile phone, tablet, and the like. The manufacturing devices 111-117 may also include network devices such as hubs, switches, routers, bridges, or any other network device.

The manufacturing devices 111-117 may be positioned along the manufacturing line 110. The manufacturing devices 111-117 may be implemented as any machinery, robotics, tooling, or other electronics that participate in an assembly (or de-assembly) process along the manufacturing line 110. The manufacturing devices 111-117 may be communicatively linked to control devices, through which the manufacturing devices 111-117 receive control signals that monitor, guide, or control the manufacturing devices 111-117. In FIG. 1, the control device 121 is communicatively linked to the manufacturing devices 111-113 and the control device 122 is communicatively linked to the manufacturing devices 114-117. The control devices 121 and 122 may be programmable logic controllers (PLC). In other examples, other types of control devices, and any other communicative linking configuration is possible.

The sensors 141-151 may monitor various locations in the industrial environment 100. In FIG. 1, the sensors 141-151 are positioned at predetermined monitoring locations along the manufacturing line 110 and proximate to the manufacturing devices 111-117. The sensors 141-151 may capture environment data for monitoring the environment 100, such as visual data, audio data, temperature data, positional or movement data, or any other environment data indicative of a characteristic of the industrial environment 100. The sensors 141-151 may communicate captured data to any device in the industrial environment 100, an analysis system, or a monitoring system.

The industrial environment 100 supports multiple communication links between any of the devices within and/or outside the industrial environment 100. The multiple communication links may provide redundancy or failover capabilities between the communicating devices. As one such example shown in FIG. 1, the control device 121 is linked to the manufacturing device 111 through both a wired communication path (e.g., through a wired cable) and a wireless communication path (e.g., via the wireless access point 131). The manufacturing devices 111-117, in that regard, may communicate across multiple technologies, including any number of wired technologies and/or wireless technologies.

A device in the industrial environment 100 may include a communication interface that supports multiple communication links with other devices within or outside of the industrial environment 100. A communication interface may be configured to communicate according to one or more communication modes, such as according to various communication techniques, standards, protocols, or across various networks or topologies. The communication interface may support communication according to particular quality-of-service (QoS) techniques, encoding formats, through various physical (PHY) interfaces, and more. For example, a communication interface may communicate according to any of the following network technologies, topologies, mediums, protocols, or standards: Ethernet including Industrial Ethernet, any open or proprietary industrial communication protocols, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, Universal Mobile Telecommunications System (UMTS), GSM (R) Association, Long Term Evolution (LTE)™, or more), WiFi (including 802.11 a/b/g/n/ac), WiMAX, Bluetooth, WiGig (e.g., 802.11ad), and any other wired or wireless technology or protocol. The control device 121, as one example, includes the communication interface 160.

A device in the environment 100 may include communication logic 161 for adapting communications in the environment 100. Communication logic 161 may support communication in response to self-configuration and network overlays in the industrial environment 100. In FIG. 1, the control device 121 includes the communication logic 161. The communication logic 161 is implemented in hardware, and may include software. The communication logic 161 may be implemented, for example, in a system on a chip (SoC), application specific integrated circuit (ASIC), or other circuitry in the control device 121.

In some implementations, the communication logic 161 may involve circuitry to perform various operations. The circuitry may include one or more processors 164 and memories 166. The memory 166 stores, for example, virtual supervisor management instructions 167 that the processor 164 executes to carry out an adaptive and configurable control network. The memory 166 may also store virtual devices such as remote terminal units (RTUs) 168 and virtual programmable logic controllers (PLCs) 169.

Figure 2:
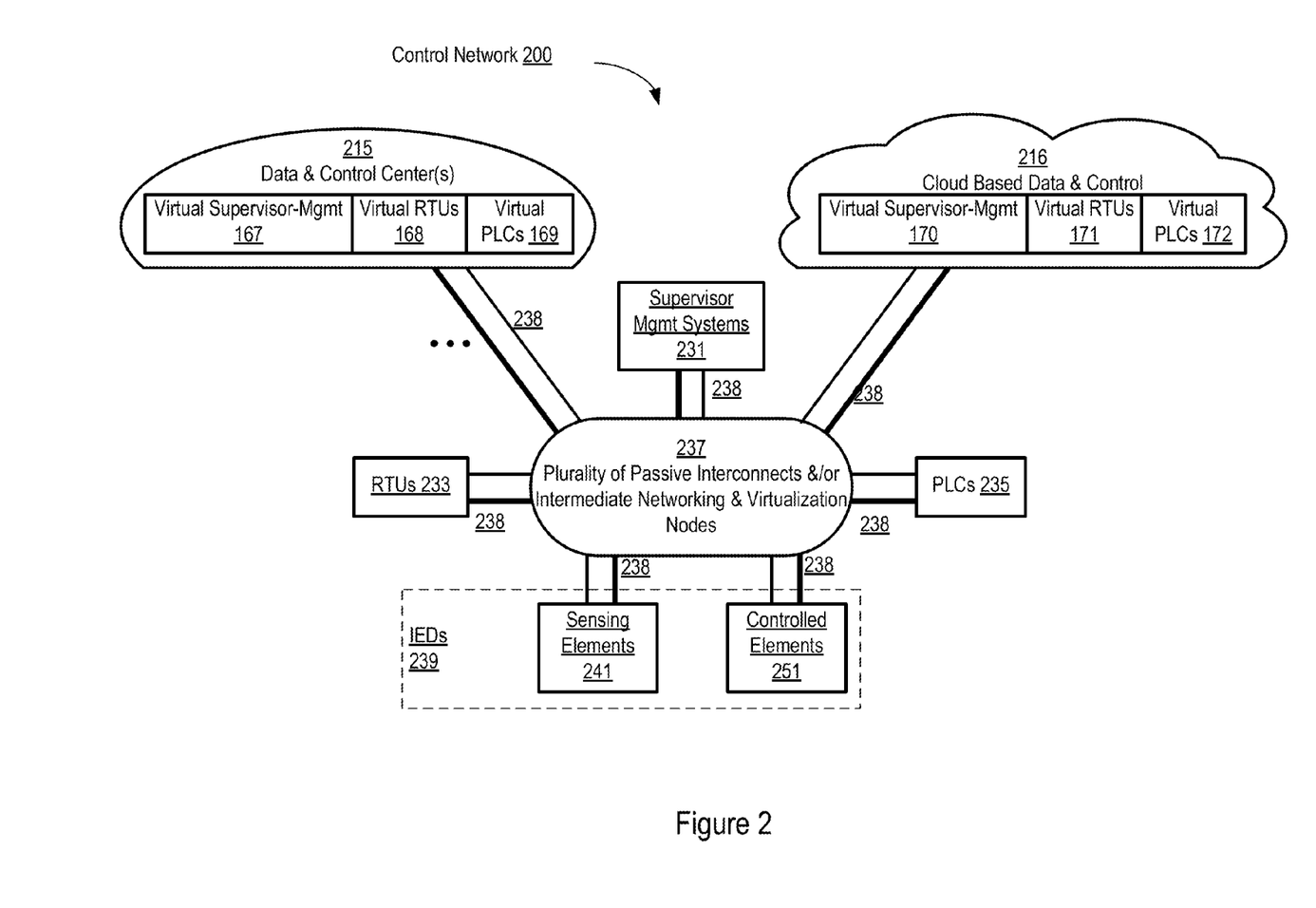
FIG. 2 shows an example adaptive industrial control network.

FIG. 2 shows an example of an adaptive and configurable control network 200 of the environment 100. A control network is generally a network of nodes that collectively monitor, sense, and control or enable control of at least part of an environment. The control network 200 may be an industrial network, such as an industrial Ethernet network. A data and control center(s) 215 may be implemented by control devices 121, 122 (FIG. 1) or other devices. The control devices 121, 122 may include electronic circuitry, such as processors, memory devices, and other such circuitry, to perform various operations. The data and control center(s) 215 may include virtual supervisor management 167, virtual remote terminal units (RTUs) 168 and virtual programmable logic controllers (PLCs) 169. The virtual RTUs 168 or other microprocessor-controlled electronic device may interface with objects in the physical environment 100 with a distributed control system (DCS) or supervisory control and data acquisition (SCADA) system by transmitting telemetry data to supervisor management systems 231 or other server computer, and by using messages sent from the supervisor management systems 231 to control the connected objects. The virtual PLCs 169 may be used for automation of electromechanical processes, such as control of motors and other machinery on factory assembly lines and/or light fixtures. Additionally or alternatively, a data and control(s) center, such as 216, may be implemented as a cloud based data and control(s) center. The cloud based data and control(s) center (216) may include virtual supervisor management element 170, virtual RTUs 171 and virtual PLCs 172. Additionally or alternatively, the control system 200 may include physical RTUs 233 and physical PLCs 235 for controlling devices on the control network 200.

The virtual and other RTUs 168, 171, 233 may connect with intelligent electronic devices (IEDs) 239 to control operation states of the IEDs 239. Passive interconnects and/or intermediate networking and virtualization nodes 237 may provide the physical connections. The interconnects and nodes 237 may support various types of networks, such as wired, wireless, cellular and other types of networks. The nodes may include switches that support running virtual PLCs, RTUs, and/or all or part of the supervisor management systems 231. The intermediate networking nodes 237 may include other devices that provide the physical connections between the devices in the control network 200. The RTUs 168, 171, 233 may connect remotely or locally with the IEDs 239 to send and receive signals from the IEDs 239. The IEDs 239 may include sensing elements 241 and/or controlled elements 251, together or separately. The IED 239 may be implemented together or separately with the device to be sensed and controlled. The PLCs 169,172, 235 may connect locally to the devices being controlled. For example, the PLCs 169,172, 235 may control alternating current (AC) or direct current (DC) drive motors with control signals.

If a configuration of any of the IED's 239 located in the control network 200 changes, the PLCs 169,172, 235 of the control center 215 and/or cloud 216 may move towards the controlled elements 251, for example, to meet timing and latency requirements. For example, by eliminating network hops between the control center and the controlled elements 251, the control center 215 may be moved closer towards the controlled elements 251. Moreover, RTU signals related to mission critical, or high priority controlling devices on the control network 200 may receive special queuing and pre-emption treatment, over network traffic carrying email for example, to reduce signal latency. A data element may be sent to the next hop node based on the element's configured behaviors.

Devices that are part of the environment 100, or control network 200 may be referred to as network devices. Thus, the network devices may include the intermediate nodes 237, the PLCs 169,172, 235, the IED's 239, RTUs 168, 171, 233, the supervisor management systems 231 and any other device that may be part of the environment 100.

Figure 3:
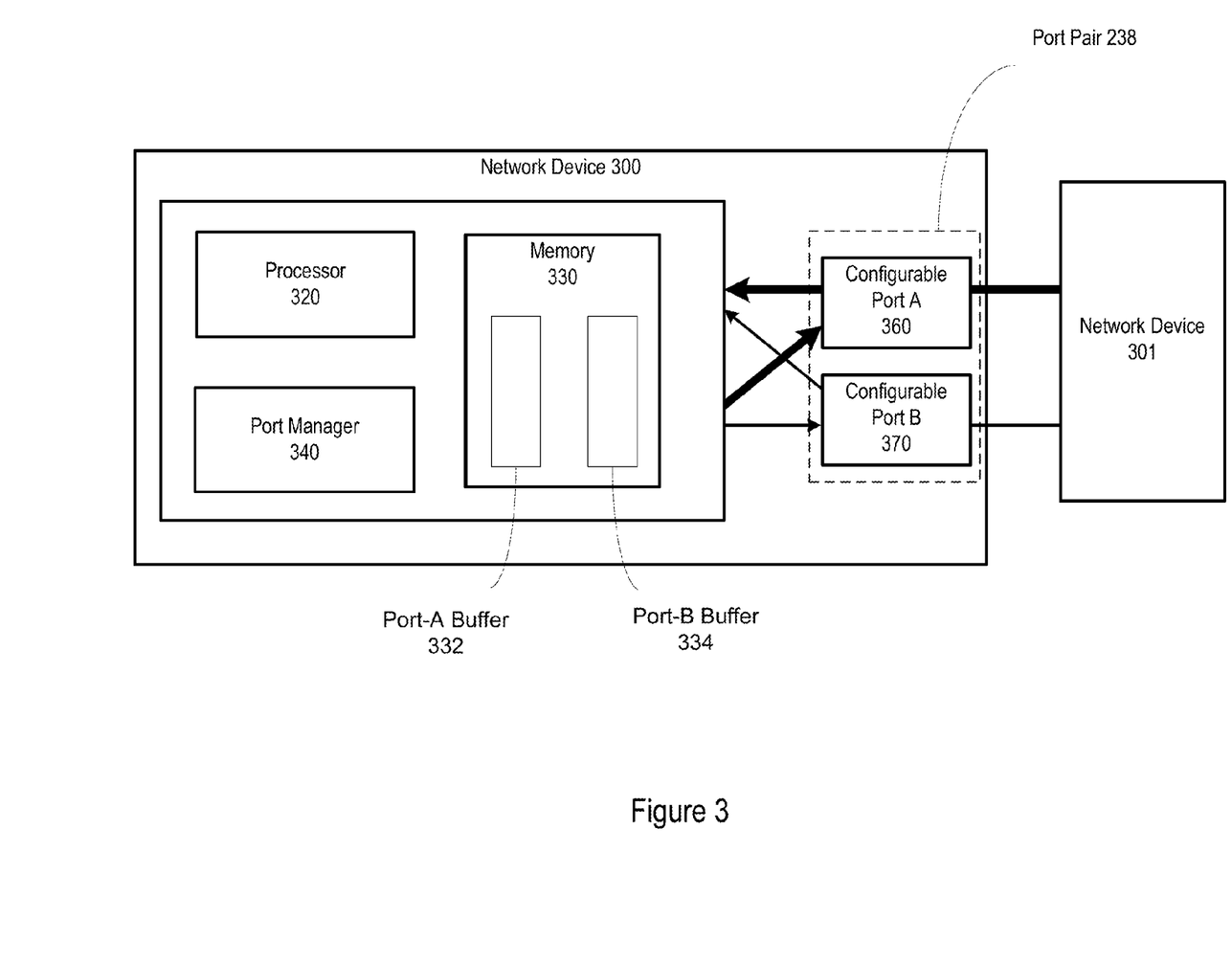
FIG. 3 shows an example network device that may be used in an example adaptive industrial control network.

FIG. 3 illustrates architecture of an example network device 300 that includes circuitry. The circuitry includes at least a processor 320, a memory 330, a port manager 340 and a port pair 238. The port pair 238 may be circuitry that includes two ports 360, and 370. The network device 300 may include other components. The components of the network device 300 may be part of a single circuitry or a collection of circuitry configured to operate as described. FIG. 3 also illustrates another network device 301 in communication with the network device 300 via the port pair 238. The network device 301 may or may not be similar to the network device 300.

The port pair 238 may enable the network device 300 to communicate over the control network 200. The network device 300 communicates over the network to exchange data such as control signals, sensor information, instructions, acknowledgements or any other such data related to the operation of the environment 100. The communication may involve transfer and receipt of communication packets, such as internet protocol (IP) packets. The communication packets may be compatible with a communication protocol that is being used for the communication, such as transmission control protocol/internet protocol (TCP/IP), user datagram protocol (UDP) or any other such communication protocols. The communication packets may have a header, body and any other such section containing contents as may be prescribed by the communication protocol being used. Alternatively, or in addition, the communication packets may be customized for the environment 100 and may contain lesser or additional fields of information. In another example, a field prescribed by the communication protocol may be used for a different purpose, such as, for example, a number of bits in header field may be used to store a unique address of the communication packet. The communication packets may be timestamped. The timestamp may indicate the time the packet was received by the network device 300. Alternatively, or in addition, the timestamp may indicate the time the packet was generated by a source device. In other examples, the timestamp may indicate the time the packet was forwarded by a network device, such as the network device 300.

The port pair 238 may be used to provide seamless redundancy. The port pair 238 may include two upstream or two downstream communication ports 360, 370 configured as circuitry to support the environment 100. The port pair 238 may also include one downstream 360 and one upstream port 370, in another example. The port pair 238 may include configurable full duplex ports 360, 370. The ports 360, 370 may also be half-duplex ports, or emulated full-duplex ports in other example network devices. Alternatively, or in addition, the network device, the port pair 238 may be a port group 238. Port group 238 may involve port groupings in which a different number of ports may be used, such as three or four ports may be grouped together, instead of grouping a pair of ports. In another example, the network device 300 may include more than one, for example, two, three, or four, port pairs. The ports 360 and 370 may be communication ports such as serial ports, parallel ports, Ethernet ports, universal serial bus (USB) ports, or any other communication ports allowing transmission and receipt of data. The ports 360 and 370 may also be virtual ports or ports used for communication via wireless medium such as WiFi, 3G, 4G or any other wireless medium.

The port pair 238 may be used to provide seamless redundancy in the communication. The redundancy may be provided selectively, such as only when the relevant communication packets are considered mission-critical. For example, for mission critical communication packets, the same communication packets may be forwarded via both ports. In one example, one port of the port pairs 238 may provide backup for the second port if a connecting path of the second port is failing. Alternatively, or in addition, the redundancy may be provided for all communication packets, irrespective of whether the communication packets are mission critical or not. In example network devices with more than two ports grouped together, the communication packets may be forwarded by all the ports grouped together.

The communication packets may be buffered at the network device 300 in the memory 330. The memory 330 may be a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. The memory 330 may contain instructions executable by the processor 320. The memory 330 may further contain buffers or queues, such as a 332 and 334. The buffers may be used to store communication packets prior to forwarding the communication packets. The processor 320 may monitor the use of the buffers. The memory 330 may contain separate buffers for each port (as shown in FIG. 3). Alternatively, or in addition, the memory 320 may contain an incoming buffer to temporarily store an incoming communication packet until the communication packet is processed. The memory 330 may also hold an outgoing buffer to temporarily store a communication packet that is to be forwarded using the communication ports. The buffers may be accessed as a first in first out (FIFO) buffer. Alternatively, or in addition, the buffers may be accessed randomly, or using any other access pattern such as last in first out (LIFO).

The incoming communication packets may be processed by the processor 320. The processor 320 may be a microprocessor, a digital signal processor, a graphics processing unit, or any other processing unit capable of executing computer readable instructions. The processor 320 may be an x86 based processor or an ARM based processor or may employ any other processor architecture. The processor 320 may be a single core or a multi-core processor. The processor 320 may be a serial processor or a parallel processor. The processor 320 may be responsible for performing operations of and/or at the network device. The processor 320 may include one or more processors. For example, the processor 320 may determine if the communication packet is a replica of another communication packet already received. For example, the network device may receive two copies of a communication packet, one on each of the ports 360 and 370. The processor 320 may compare the payload in the communication packets to determine whether the communication packets are replicas of each other. Alternatively, or in addition, the processor 320 may compare identifiers or header information in the communication packets to determine if the communication packets are replicas. The timestamps in the communication packets may be used to determine which of the communication packets was received first. The processor 320 may use the first communication packet for further processing. The later received packet may be dropped. The processor 320 may extract information from the first communication packet and repacketize the information for forwarding to the next hop device. The processor 320 may add information to the communication packet during the repacketization prior to forwarding the repacketized communication packet to the next hop device.

In an example, the processor 320 may monitor the buffers stored in the memory 330. For example, the processor 320 may determine if a buffer, for example, an outgoing buffer for communication port 360 contains a number of communication packets above a predetermined threshold. In such a case, the processor may instruct the port manager 340 to reconfigure the communication port 370 using settings similar to the settings of the port 360. The buffered communication packets may then be forwarded via both the communication ports 360 and 370. Once the count of the number of communication packets in the buffer falls below the threshold, the ports 360, and 370 may be configured to their original settings.

The ports 360, 370 may be configured by the port manager 340. The port manager 340 is circuitry that is hardware, or a combination of hardware and software. For example, the port manager 340 may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of the port manager 340 by a processor may also refer to logic based processing by the module that is initiated directly or indirectly by a processor to complete a process or obtain a result. Alternatively or in addition, the port manager 340 may include memory hardware, such as at least a portion of a memory, for example, that includes instructions executable with a processor to implement one or more of the features of the module. When the port manager 340 includes instructions stored in memory and executable with the processor, the port manager 340 may or may not include a processor. In some examples, the port manager 340 may include only memory storing instructions executable with the processor 320 to implement the features of the port manager 340 without the port manager 340 including any other hardware. Because the port manager 340 includes at least some hardware, even when the included hardware includes software, the port manager 340 may be interchangeably referred to as a hardware unit, such as the port manager hardware unit.

The port manager 340 may dynamically configure the communication ports 360, 370 by providing setting values to be used when communication packets are communicated via the communication ports 360, 370. The ports 360 and 370 in the port pair 238 may be configured the same as each other or differently. For example, port 360 may be configured for high throughput and low latency, with lower coding robustness (for example, possible higher error) and more power consumption than lower throughput ports 370. The port 370 may be configured at a lower throughput, lower power (for example, large queue and burst mode delivery), and higher coding robustness than the high throughput port 360. In a seamless redundancy example, a communication packet may be transmitted using each of the ports 360 and 370 using the respective different configurations described above. Thus, the same communication packet may be treated differently by the two communication ports 360, 370 based on the respective configurations. Other port configurations at varying levels of latency and robustness are possible. For example, for mission critical communication packets, both ports in the port pair 238 may be configured for low latency. The way that communication packets are treated and/or transmitted using the port pair 238 may be revised, or reconfigured dynamically as the communication packets travel through the ports.

For example, a communication packet may contain port configuration information that may be extracted by the processor 320 and/or port manager 340 upon receipt of the communication packet. The extracted port configuration information may then be used to adjust the settings of the communication ports 360, 370. Thus, in an example, the port manager 340 may configure the communication port 360 for transmission of a received communication packet as per the settings indicated by the received communication packet. The port manager 340 may also reconfigure the port 370 according to the same settings or a separate set of settings in the received communication packet. Once the communication ports 360, 370 are reconfigured, the communication packet may be forwarded. In another example, the communication packet may only contain an identifier of a communication profile to be applied to the communication ports. The communication profile may contain predetermined values for the possible settings of the communication ports 360, 370. For example, a 'green' or 'eco-friendly' profile may set the communication ports 360, 370, to consume relatively lesser power by setting a sleep mode behavior of the communication ports 360, 370. The profile may also provide information regarding other behavior of the communication ports 360, 370, such as latency, queuing, throughput, bursty behavior, maximum transmission unit (MTU), and other such settings.

The latency of a port indicates the time required to forward a communication packet to the next hop device. The queuing behavior indicates whether a communication packet is buffered before forwarding, or alternatively may provide the predetermined threshold number of communication packets to hold in a buffer before the network device 300 may take steps to adjust other communication ports to forward the buffered communication packets. The throughput may indicate a rate at which the communication packets are to be forwarded by a communication port. The bursty behavior, or burstiness of a communication port indicates transfers in which multiple communication packets are transferred at the same time. Thus, a burstiness setting, may indicate whether to operate a communication port in a burst-mode. Alternatively, or in addition, the burstiness setting may indicate a number of communication packets to group in a burst. In an example, the configuration settings relayed to the network device 300, via the communication packet or via the communication profile may contain values for the settings of each of these behaviors. Alternatively, only those configuration settings that are to be adjusted, or modified may be relayed to the network device 300.

Alternatively, or in addition, the port configuration information, containing the setting values, may be based on information, or instructions, received from the supervisor management systems 231. As discussed elsewhere, the supervisor management systems 231 may be a server computer, or a controller, that may monitor hop-by-hop performance of the control network 200. The supervisor management systems 231 may support provisioning of network devices without requiring physical access to each network device.

The ports 360, 370 may be reconfigured for one or more of several possible reasons. An overlay for the network 200 may determine how ports, nodes, switches, elements, and other network devices like the network device 300 are used in the network 200 to communicate the communication packets. The overlay may also be referred to as a network tier, or a layer. Overlays may be viewed as control planes, such as, overlays for security, safety, outsourcing analysis, and customizable planes for particular functionality. The overlay, for example, may be based on classes of service associated with the communication packets. In one example, the port manager 340, and thus the network device 300, may identify mission critical communication packets, for example, by reading the header of the communication packet. Overlay determined ports, or network devices in the network 200 may be dedicated for use with the mission critical communication packets. For example, communication of the mission critical communication packets may be given priority by the ports 360 over non-mission critical communication packets. In another example, both ports 360 and 370 of the network device 300 may be dedicated to handling mission critical communication packets instead of other types of communication packets. Through the layering, or tiering, different levels of configuration of the network 200 may accommodate different types of class of service for the communication packets.

A data, such as an identifier, contained in the header of the communication packet, may be used to determine the type, or class of service for the communication packet. Communication packet overlay data may be forwarded as is or reconfigured for the subsequent hop dual port flows. The supervisor management systems 231, virtual supervisor management 167, 170 and/or other flow management software element associated with the node's port pairs 238 may monitor pathway performance and adapt configurations of the control network 200 as needed to meet the class of service. For example, the ports 238 may be configured to send mission critical type one communication packets in a burst. Certain network devices may also be dedicated for the mission critical type one communication packets, and not be used to handle other types of communication packets. Thus, a communication path for the communication packet is determined, from multiple possible communication paths. In addition, a priority or queuing method may be used on the determined path, by using techniques and tools such as DiffServ based on network parameters such as QoS.

Further, the supervisor management systems 231. may itself be managed via a single central application and extended to service and address the particular flow requirements of the nodes and associated control loops. The supervisor management systems 231, or the processor 320, may also deliver upstream (and/or downstream) communication packet flow. The packet flow may be based on first arrived communication packet data by using communication packet priority information, such as a level of priority, included a header of the communication packet.

To take advantage of the tier, or overlay topology, the network device 300, such as a PLC/PAC/RTU may mark all control related traffic it sources as belonging to a first tier, such as tier one, while delivering background statistics via a second tier, such as tier two markings. Intermediate network devices, such as network device 301, may take such marks into consideration for processing and for selecting appropriate ports at the intermediate network device via tier overlay specific routing, such as routing table entries. Internally, processing may involve entirely independent and non-overlapping architectures each dedicated to a particular tier. Alternatively, any part or all of the processing resources may be shared between tiers with arbitration and management being managed to favor a particular tier, such as a tier one over another, such as a tier two, when conflicts or resource competition arises. For example, a dual switch fabric might be employed or a single fabric that favors the first tier over the second tier (such as based on packet marking) may be employed.

A failure and/or degradation of performance associated with a network tier may be at least temporarily serviced via usurping resources of a second tier. In an example where the network tier experiencing the failure is a preferred network tier, the resources servicing the second network tier may be reconfigured according to the settings associated with the preferred network tier. In example systems, an excessive load on a network tier may also be temporarily handled by the second network tier in a similar manner, by reconfiguring the network devices, or ports allocated to the second network tier to communicate the communication packets that belong to the first network tier. In an example, the network device 300 may detect a failure or excessive load situation in case of port 360, which may be allocated to the first network tier. The processor 320 may be responsible for the detection. The network device 300, via the processor 320, may take the necessary steps to resolve the situation, by reconfiguring the port 370. Alternatively, or in addition, the network device 300 may raise an alarm and indicate to the supervisory management systems 231 of the situation. The notification may be sent via the network. The supervisory management systems 231, in response, may instruct the network device 300 to reconfigure the port 370. Alternatively or in addition, the supervisory management systems 231 may use another network device instead of/in addition to the network device 300.

In an example, the failure or excessive loading situation may be associated with a network tier which is a non-mission critical network tier, or a network tier that has lower preference than another network tier. In such a case, the ports or network resources allocated to the network tier with the higher preference may not be reconfigured. Alternatively, if an alarm is raised regarding the a status, such as a failure or excessive loading, of the lower preference network tier, the supervisory management systems 231 may neglect the alarm.

The control network 200 may be divided into tiers, such that a communication profile (or operation profile) associated with the network devices, or ports allocated to a first network tier is different from a second communication profile associated with the network devices, or ports allocated to a second network tier. Thus, a dual or shared architecture may be allocated within the control network 200. This may also be referred to as a dual switch fabric since, for example, two communication network tiers with different settings can be implemented using common network devices and resources. Further, the network resources may dynamically switch between the one or more network tiers. By using a port pair or a group of ports, the one or more network tiers may coexist in parallel. For example a first port may be configured to operate on a first tier and a second port may be configured to operate on a second tier. Failover or redundancy may be achieved by transmitting a communication packet on both tiers, although, possibly the backup packet that is transmitted on a backup tier may be transmitted at a lesser resolution/format than a primary communication packet.

The division of tiers may be determined such as a first tier serves transmission of mission critical communication packets, for example control signals, while a second tier serves transmission of background data, for example statistics related to the control signal. Alternatively, or in addition, the tiers may be setup such that the first tier operates at a low latency and high throughput, while the second tier operates at a higher latency, lower throughput, but a relatively higher robustness. Robustness may be an indication error-free transmission of data over the network. In yet another example, the tiers may be further subdivided, for example, based on the content of the communication packet, such as subdividing a mission critical tier to include a category for actuator, sensor, and/or PLC control signaling.

Allocation of the network device 300 or ports 360, 370 to a particular tier may be reconfigured on the fly, or dynamically, by reconfiguring the ports 360, 370. Each tier may have one or more corresponding communication profiles that include the communication port settings corresponding to that tier. For example, a mission critical tier may have a corresponding communication profile that adjusts the communication port 360 to transmit data at a low latency and high throughput. Thus, the port 360 may be allocated to the mission critical tier by applying the settings according to the mission critical communication profile. The port 370 may be allocated to a separate tier, such as a high certainty tier. The high certainty tier communication profile may include settings for the communication port 370. The settings for the communication port 370 may be different than those of the communication port 360. In one example, the port 360, as part of the mission critical tier, may be configured to transmit data at a higher rate (low latency, high throughput) while the port 370, as part of the high certainty tier, may be configured to transmit the data with higher robustness but with lower throughput and possibly higher latency. Alternatively, both ports 360 and 370 may be allocated to the same tier, or the settings for the communication port 370 may be identical to those of the port 360. Thus, the communication ports 360, 370 may be dynamically configured for their respective tier roles. In other examples of the network device the underlying circuitry of the communication ports 360 may be identical to that of port 370 from another tier. Alternatively, the underlying circuitry of the ports 360, 370 may be tailored for their respective tier roles.

Allocation of nodes or ports to a particular tier may be reconfigured on the fly centrally or via a node by node treatment using underlying enhanced routing information. For example, the supervisory management system 231 may centrally determine the network tiers and the allocation of the communication ports to the tiers. The supervisory management system 231 may use the network performance information that is being monitored to determine the network tiers and the corresponding allocation of ports to the tiers. Thus, the supervisory management system 231 may automatically configure the network into tiers and allocate the network devices and ports accordingly.

Autoconfiguration of overlay tiers may involve the supervisory management system 231 discovering overall topology including ports and network devices and their capabilities. The supervisory management system 231 may also find latency, time critical, and other requirements associated with end point nodes. Based on such information, the supervisory management system 231 may auto-configure the two (or more) network overlay tiers so that the latency and time critical conditions of the end nodes are met. Autoconfiguration may include delivering the configuration instructions to each network device which includes sending the port configuration settings to the network devices.

The supervisory management system 231 may trigger an auto reconfiguration any time topology changes are detected. Overlays, or tiers, in the network may be mapped out based on the port settings by comparing the port settings to expected port settings of a particular tier. Thus, a topology map of the entire control network 200 may be generated by the supervisory management system 231. A change in the topology may be detected by monitoring the settings of the communication ports across the network 200. In an example, to support automatic (re)configuration, network devices may respond to requests for capability and/or requirement information. Thus, the supervisory management system 231 may request such information from the network devices 300 for any time critical or latency conditions that may have to be met for operation of the network devices 300. Alternatively, or in addition, the supervisory management system 231 may make one or more requests to the network device 300 for the port settings of the communication ports 360, 370. Alternatively, or in addition, the network device 300 may advertise such information upon coming online, when changes occur, and/or based on other conditions. For example, the network device 300 may advertise the port settings of the communication ports 360, 370 when the network device 300 comes online.

A system administrator may alter the reconfiguration settings by manually altering the communication profiles associated with the tiers. The system administrator may also alter the port settings directly. By selecting or altering one of such profiles or settings, a tier two reconfiguration may take place which may cause a reconfiguration of tier one. The network device 300 or the supervisory management system 231 may maintain prior configuration data to support quick and secure roll back to previous configuration profiles or settings.

Alternatively, or in addition, the communication profiles or port settings may be altered automatically. For example, the overlays may be automatically reconfigured based on deterministic latency within switch spanning/routing tables, or port flow per particular packet classes. Selection of the network devices or ports in a tier may be adaptive. For example when latency of communication via a port exceeds a predefined threshold, an alternative port may be selected. Alternatively, or in addition, an alternative path, involving a different network device may be selected to be part of the network tier. In another example, a parameter other than latency, such as robustness, may be considered for selection of the tier. In other examples, more than one parameter may be considered for selection of the network devices on a network tier.

Figure 4:
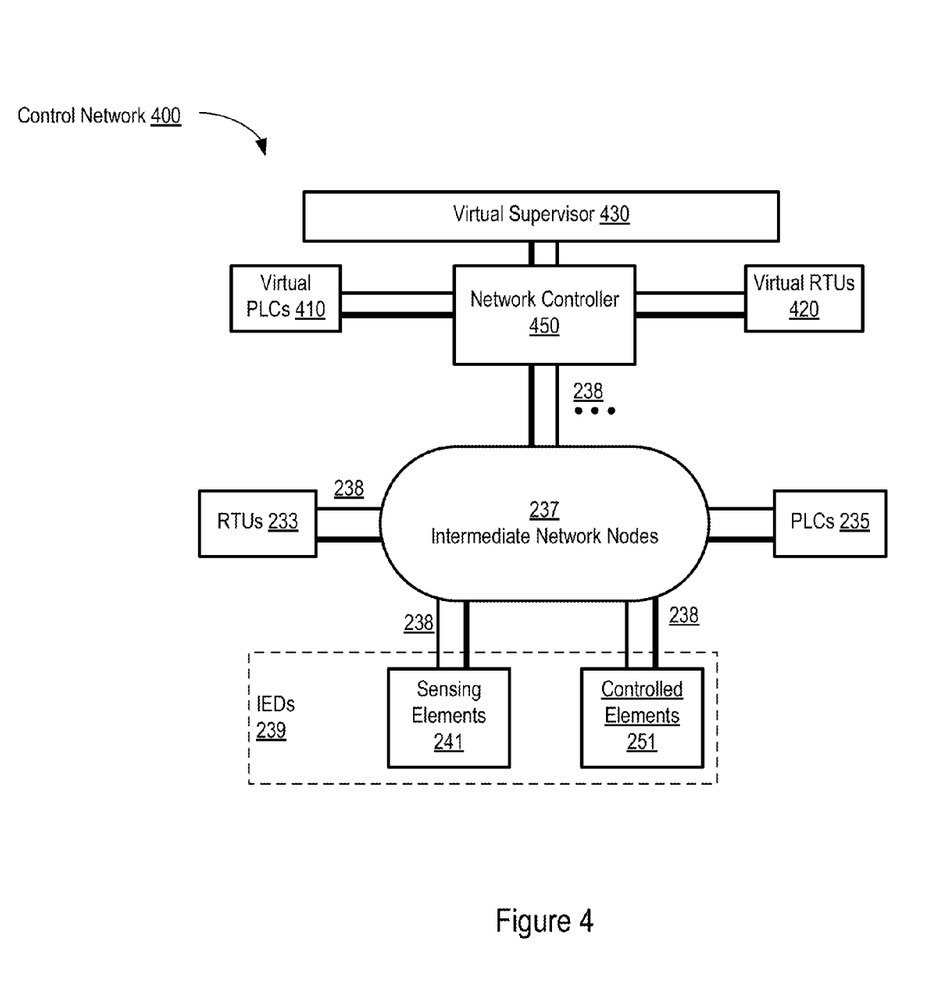
FIG. 4 shows another example of an adaptive and configurable control network.

FIG. 4 illustrates an example control network 400. A control network, also referred to as a Process Control Network (PCN), includes a communications network for transmission of instructions and data, such as between control and measurement devices and Supervisory Control and Data Acquisition (SCADA) devices. Control networks can be used in an industrial setting to achieve higher robustness, lower latency and determinacy. Robustness includes characteristics such as connection redundancy, reduced sensitivity to Electromagnetic Interference (EMI), and error checking and correction. Determinacy involves providing network access to each device in the control network, and can include mechanisms to allow selective transmission of data and/or instructions at higher priority (such as alarms) through the system.

The control network of FIG. 4 may include at least a network controller 450 communicable with a IEDs 239, RTUs 233, and PLCs 235 via intermediate network nodes 237, over the control network using port groups 238. FIG. 4 shows the port groups as port pairs 238, however, the port groups may involve more than two ports. The IEDs 239 may further include the sensing elements 241 and the controlled elements 251. The network controller 450 of FIG. 4 may further communicate with virtual PLCs 410, virtual RTUs 420, and virtual supervisor 430.

The network controller 450 may be a central server computer, or a distributed server including one or more server computers. The network controller 450 may include one or more processors specifically programmed via instructions stored on one or more non-transitory memory to manage the control network 400. In another example, the network controller 450 may be an interface between the virtual network devices 410, 420, 450, and the physical network devices 233, 235, 239. The network controller 450 allows network administrators to have central control of network traffic without requiring physical access to the intermediate network nodes 237, such as switches. Alternatively, or in addition, the network controller 450 may support configuring behavior of the IEDs 239. The network controller 450 may configure the IEDs 239 according to industrial environment specifications regarding overlay tiers, seamless redundancy, and failover. In another example, the network controller 450 may also configure the on-the-fly, or dynamic, adaptation of the ports of the network devices, including the intermediate network nodes 237 and IEDs 239. The network controller 450 may configure the network devices completely automatically or in a semi-automated manner.

The network controller 450 may decouple a control plane from a network traffic routing plane. The network traffic routing plane, also referred to as a data plane, or a forwarding plane, typically, represents, the combination of hardware and/or software that decides what to do with incoming network packets. In an example of a network traffic routing plane a table, such as a routing table, is used to look up a destination address of an incoming network packet and the information necessary to determine a network path from the source address of the incoming network packet to the destination address. An example control plane is concerned with determining and collecting information that is stored and maintained, such as in a routing table, that is accessed during operations in the network traffic routing plane. Additionally, or alternatively, control plane logic may indicate preferential treatment of certain packets for which a quality of service different than other packets is requested. The preferential treatment may involve routing the certain packets, such as high priority packets, via a preferred route. For example, a non-preferred packet may be transmitted towards a destination address D via network devices N1, N2, N3. Instead, a preferred packet for destination D may be transmitted via network devices N1, N2 and N4 (or any other combination of network devices) based on cumulative latency to transmit the packet via N1, N2, and N4 being lower than for N1, N2, and N3. The other path may be selected on one or more factors other than the latency, such as robustness.

The network controller 450 may segregate the network traffic, such as the network communication packets in the data plane and the control plane. For example, the data plane and the control plane may be broken into tiers using the overlay/tier concept. For example, the control plane may be arranged to support intricate timing and synchronization demands of industrial control networks. Further, instead of simply selecting a network path, the network controller 450 may reconfiguring the sensors and actuators (IEDs 239) and/or the ports at the IEDs according to the communication packet that needs to be communicated. The network controller 450 may determine the setup, or configuration of the ports at the IEDs for the communication packet based on an identifier in the communication packet itself. Alternatively, or in addition, the network controller 450 may identify the nature or type of the payload in the communication packet and determine the port configurations accordingly. Alternatively, or in addition, the network controller 450 may provide communication profiles to each network device. The communication profile may be a set of rules indicating the port configurations to be used for particular types of communication packets. The communication packet type may be determined based on an identifier in the communication packet itself or the payload being carried by the communication packet. For example, the communication packet may be carrying a control signal from a PLC 235 to an IED 239, such as a sensor 241. The ports at a network device 237 forwarding the communication packet to the sensor 241 may be configured according to the settings provided in the respective communication profile for control signals. In another example, the communication packet may be carrying, as the payload, sensor data from the sensor 241 to the PLC 235. The ports at the network device 237 may be configured for the communication packet carrying the data as indicated by the communication profile. The port configuration for the communication packet carrying the sensor data may be different than the port configuration for the communication packet carrying the control signal. The port configuration may include settings such as related to latency, burstiness, robustness and throughput. In the above example, the port settings for the communication packet carrying the control signal may correspond to relatively low burstiness, while the port settings for the communication packet carrying the sensor data may correspond to relatively high burstiness. In addition, or alternatively, other settings may also be varied. The communication profile provided by the network controller 450 may provide such settings.

The network controller 450 may reconfigure the communication profiles. Alternatively, or in addition, a network administrator may modify the communication profiles directly. In another example, the network administrator may trigger the network controller 450 to reconfigure the communication profiles. Alternatively, or in addition, the communication profiles may be reconfigured by the network controller 450 automatically in response to an event, such as failure of a network device, or flexible manufacturing rearrangement of devices. The network controller 450 may also trigger the reconfiguration of the communication profiles according to a schedule, such as every week, every month, every day, every first Monday of a month and other such periodic or arbitrary schedulable events. Installation of a new network device may also trigger a reconfiguration. Such reconfiguration, or adaptation caused by an event, such as failure of a network device, may not only trigger a localized reconfiguration at the network device associated with the event, but may also trigger a network wide reconfiguration.

The network controller 450 may reconfigure the communication profiles to any extent to meet operational settings of the industrial control network. The operational settings of the industrial control network may provide threshold values, or a range of values, for the available settings. For example the operational settings may include a maximum per-hop latency, a minimum robustness, a minimum and/or maximum burstiness and throughput and other such threshold values for the network controller 450 to abide by. Alternatively, or in addition, the operational settings, or performance settings for the control network 400 may include worst case delay, or average delay, or loop time, for communicating a communication packet between successive hops or from a source to a destination node. A change in the operational, or performance settings by a network administrator or any other entity may itself trigger a reconfiguration. Certain performance requirements associated with an earlier configuration may still be maintained during the reconfiguration. Alternatively, or in addition, the certain earlier configuration settings may be temporarily impacted while the administrator updates the communication profiles in response to alarms, or other events such as to eliminate a problem or add a new network node or other capabilities to the control network 400. The network controller 450 may monitor the performance of the network devices and detect an irregularity in performance and may trigger a reconfiguration in response. For example, the network controller 450 may monitor latency in forwarding a packet from an intermediate network node 237, such as a switch, or a router, to a next hop intermediate network node. If the latency is out of a predetermined acceptable range, the network controller may trigger a change, such as in the port settings at the forwarding and/or receiving intermediate network nodes.

Alternatively, or in addition, in response to a change in operational, or performance settings, the network controller 450 may remap the topology of the control network 400. The network topology may represent the physical and/or logical structure of the control network 400. Physical topology refers to the placement of the network devices, including device location (such as physical location or location relative to other devices) and/or cable installation, while logical topology indicates flow of data within the control network 400, regardless of the physical topology. The network controller 450 may reconfigure the logical topology to meet operational, or performance settings. The network controller 450 may adopt a mesh, ring, star, bus or any other topology to meet the performance settings. Thus, in the above example in which the latency to forward a packet from a first network device to a second network device was out of an acceptable range, the network controller 450 may reconfigure the topology of the control network 400 so that the first network device may send a communication packet to a third network device as a next hop device, where the latency to transmit the packet to the third network device is within the acceptable range.

The network controller 450 may provide a respective communication profile to a network device upon initialization of the network device. For example, a network device, upon initialization, may reach out to the network controller 450 and auto-download a corresponding communication profile. The network device may verify the communication profile. Concurrently, the network controller 450 may, for security purposes, identify or request a unique identifier, such as a media access control (MAC) address of the network device and store the unique identifier, such as the MAC address. The network controller 450 may use the unique identifier, such as the MAC address to verify (and potentially configure) further communications from the network device once a network device goes live. For example, the network controller 450 may be given a list of MAC addresses of the network devices at the time the network devices are purchased, so that when a network device is replaced or relocated, the network controller 450 knows what the network device is based on the corresponding MAC address. The network controller may dynamically re-provision the communication profiles for the network device and/or the other network devices in the control network 400 accordingly. In an example, the entire network may be automatically reconfigured in response to installation of a new network device. The network controller may also cache the frequent port settings or communication profiles to provide dynamic reconfigurations efficiently.

Thus, in the control network 400, the network devices, such as PLCs 235, RTUs 233, and intermediate network nodes 237, may, in response to interrupts or other such network events perform data analysis of the event itself, or make a request for data analysis to the network controller 450. Data analysis may also be triggered/requested in response to an incoming communication packet. The port settings at the network device may be reconfigured based on the analysis. The port settings may be reconfigured by the network device itself or the network controller 450. The port settings may be reconfigured based on the communication profile assigned to the network device or based on settings included in the communication packet itself.

The port settings for a single port, from a port group, such as a port pair may be reconfigured. A second port in the port group may continue to operate according to the existing settings, or alternatively the second port may also be reconfigured. In either case, the second port may be used for seamless redundancy by transmitting, via the second port, a replica of the communication packet forwarded via the first port. Thus, the communication packet and the replica of the communication packet may be transmitted by the first port and the second port using different port settings. For example, the communication packet may be forwarded via the first port using a relatively lower latency and higher throughput setting, while the replica of the communication packet may be transmitted via the second port using a relatively higher robustness setting. While the payload in the communication packet and the replica of the communication packet is the same, the two communication packets may have different information in other fields of the communication packets, such as the headers. For example the communication packet may contain an identifier(s) corresponding to the port settings of the first port while the replica of the communication port may contain an identifier representative of the port settings of the second port.

The network may be configured on a group-by-group basis. A group may include intermediate network devices and corresponding IEDs. For example, a group may be composed of an intermediate network device such as PLCs or RTUs (control logic devices) and the IEDs, such as sensors and actuators, that are supported/defined by the control logic device. The network devices and/or the ports at the network devices in a particular group may share a common communication profile, or common port settings. For example, the network devices in a group may all be configured with port settings with a low latency and high robustness. Another parameter that may be shared among the network devices in a group is the maximum transmission unit (MTU). For example, the network devices in the group may all share a particular MTU.

At times, when communication packets are transmitted from a network device in one group to a second group, the port settings of the forwarding network device may be dynamically configured. In another example, a network device may be part of two or more groups and may be frequently reconfigured. For example, a first group of network devices may be determined that contains a first set of control logic devices and a first set of IEDs. A second group of network devices may contain a second set of control logic devices, a second set of IEDs. At least one of the control logic devices and/or the IEDs from the first group may also be part of the second group. The common network device may be configured with port settings corresponding to the first group when forwarding communication packets among network devices of the first group, while the port settings may be dynamically reconfigured according to the port settings corresponding to the second group when forwarding communication packets among network devices of the second group. The communication packets may include an identifier representative of the group containing the associated network devices. Alternatively, or in addition, the forwarding network device may identify the port settings to be applied based on other fields of the communication packet, such as the source address, the destination address, or the payload.

In another example a third group may include both the network devices of the first group and the second group. One or more port setting values, such as the MTU, associated with the third group may be different than the corresponding port setting values for the first and second groups. The network devices in the third group may enforce the port setting values of the third group in such a case for all the communication packets, but can use some port setting values corresponding to the first group or the second group based on the group to which the network devices associated with the communication packet belong. Thus, for example, in this case, when a communication packet is being forwarded to a network device of the first group, the port settings may involve a combination of the port setting values from the communication profile corresponding to the third group and port setting values from the communication profile corresponding to the first group.

The group of network devices is different than the overlay/tier described earlier. The control network may contain both overlays and groups. For example, referring to FIG. 2, the RTUs 168, 233, and 171 may be part of an overlay while the RTU 233, sensing element 241 and a controlled element 251 may be part of a group. As another example, the data and control center 215 may be a group including the virtual supervisor 167, virtual RTU 168, and virtual PLC 169, while all the constituents of the group along with the intermediate network devices 237, and IEDs 239 may form an overlay. Thus, the system and the network controller 450, may configure the control network as overlays and or groups. The network controller 450 may automatically associate network devices to a group. Alternatively, or in addition, a network administrator may identify a group to be used. The routing tables involved in transmission of the communication packets in the control network may record the groups to which a network device belongs. Alternatively, or in addition, the network controller 450 may keep track of a group or groups to which a network device belongs.

The groups may be changed dynamically. For example, a sensor may participate in a first group and therefore be associated with a first configuration until an event is detected which may trigger a reconfiguration of the groups. The events triggering group membership adjustment may involve adding a new sensor to the system, or a variance in performance, such as sensor sampling frequency, or sensor failure, or any other such events. For example, an event may include a sensor delivery volume of content that may cause the associated group (or groups) to reconfigure. Alternatively, or in addition, a network administrator may adjust the groups arbitrarily. The network administrator may trigger a re-grouping by the network controller 450 or may directly indicate the groups and their respective constituents. Re-grouping may result in creation of new groups and/or removal of existing groups. Groups may also be placed into an idle state. For example, in an idle state, the entire group may be set to not respond to any sensor input. This may be done to avoid multiple groups or controllers encountering an error, or a failure concurrently. For example, multiple groups may be executing a common code snippet, or responding to a common event that may cause the error or failure. By putting a group into idle state (or "cold standby"), that group may recover from the error, or come back on line faster.

Thus, the network controller 450, in an industrial networking context, may be responsible for configuration of the network devices and thus the industrial network. The network controller 450 may configure the network devices according to timing sensitivities, robustness and other such operational parameters of the industrial network. The network controller 450 may distribute part of the functionality, or intelligence to the network devices, such as the switches. This may enable a real time dynamic reconfiguration of the network devices, and the port settings at the network devices to meet the performance settings of the control network. Alternatively, or in addition, the network controller 450 may reconfigure the network devices and the port settings from a central location, such as a server computer.

In another example, the network controller 450 may be an interface between the virtual network devices, such as 41. Communication packets from the physical devices directed towards the virtual devices and similarly, communication packets from the virtual devices directed towards the physical devices may pass through the network controller 450.

Figure 5:
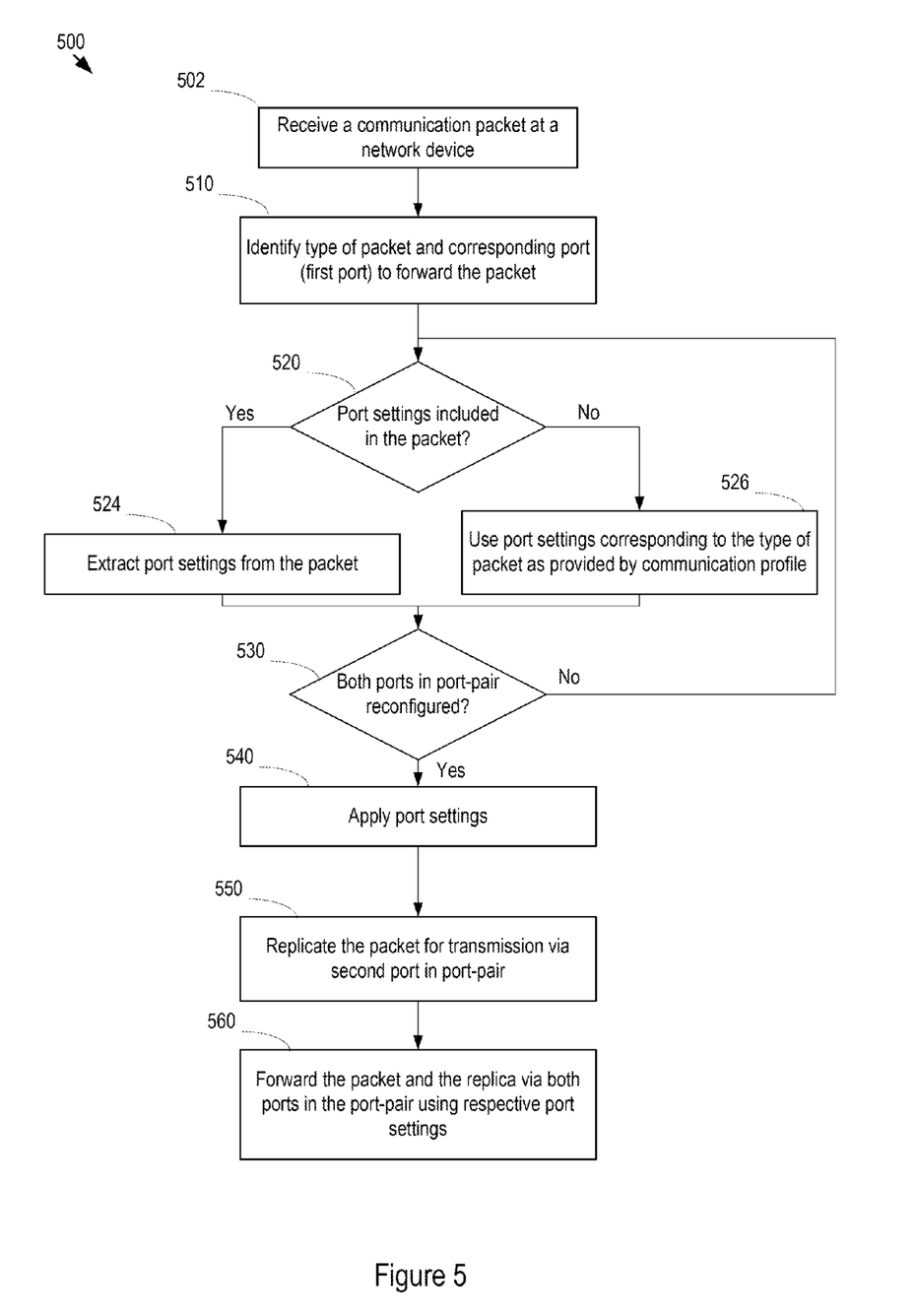
FIG. 5 shows a flowchart of example steps that may be performed in an example adaptive control network.

FIG. 5 illustrates, as a flowchart 500, some of the example steps that may be performed in a control network, such as in an industrial networking environment. In step 502, a communication packet may be received at a network device, such as a PLC 235, an RTU 233, IED 239, or an intermediate network device 237, such as a switch. The network device may include a group of ports in each direction, upstream and downstream. For example, the group of ports may be a port-pair. Thus, the network device may have a first port-pair servicing upstream packets, such as to receive communication packets and a second port-pair servicing downstream packets, such as to forward communication packets to a next hop network device. In step 502, instead of receiving the communication packet, the communication packet may be generated by the network device itself.

In step 510, the network device may identify a type of the communication packet and accordingly identify the port to be used to forward the communication packet. The type of the communication packet may be identified based on an identifier included in the communication packet. Alternatively, or in addition, the payload of the communication packet may be analyzed to determine the type of the packet. For example, the network device may determine that the packet is of a control signal type based on the payload of the communication packet containing a control signal from a PLC directed to an IED. Alternatively, the communication packet may be identified as a data packet based on the communication packet containing sensor data. There may be various other types of communication packets that may be identified by the network device and the type of the communication packet identified does not limit the present disclosure in any way. The network device may have set up a first port of the downstream port-pair to forward the type of the identified communication packet. The first port may be chosen based on a communication profile assigned to the network device. The communication profile may be assigned to the network device by a network controller or by a network administrator.

In steps 520-530, the network device may configure the two ports dynamically. This may involve reconfiguring the settings of the port. The network device, in step 520, may determine whether the communication packet contains applicable port settings and in step 524, may extract the port settings in such a case. Else, in step 526, the network device may use port settings corresponding to the type of the communication packet as provided in the communication profile. In step 530, the network device may go through steps 520, 524, and 526 for as many ports in the group of ports, in this example twice. In an example, the communication packet may contain only one set of port settings for the first port, and the second port (and consequent ports) may be configured according to the settings in the communication profile. The identified port settings may be applied to the respective ports in step 540. The port settings for the ports may be identical, or different. For example, the port settings may change latency, throughput, burstiness, and/or robustness.

In step 550, the communication packet may be replicated. As many replicas of the communication packet may be created as the number of ports in the port group. Thus, in case of the port pair one replica of the communication packet may be generated. The replica may contain the same payload as the original communication packet, but may contain different information in the header. For example, the original communication packet may contain the port settings for the first port, while the replica may contain port settings applicable to the second port in the port-pair. In another example, the replica may be an exact replica of the communication packet. In step 560 both the communication packet and the replica of the communication packet may be forwarded via the first and second communication ports respectively.

Alternatively, or in addition to forwarding an incoming communication packet via the first communication port, the network device, may generate a communication packet based on the incoming communication packet. The generated communication packet may be a repacketized version of the incoming communication packet with the payload of the incoming communication packet but different information in the other fields.

In an example, the network device may receive two (or more) communication packets via the port pair in which the two communication packets are replicas of one another but sent via separate ports with different port settings from an earlier hop network device. The network devices may timestamp the incoming communication packets and buffer them in separate buffers corresponding to each of the ports. When analyzing one of the incoming communication packets, the network device may identify the communication packet that was received first in chronological order and use that communication packet for further processing, instead of a replica of that packet that may be received via other ports of a group of ports.

In example systems with control networks, the network may be organized and configured using overlays, groups, or a combination of both in addition to a control plane and network traffic plane. For example, once the network devices, such as the intermediate network devices, control devices (such as PLCs, RTUs) and IEDs are initialized and connected to an industrial network, working groups may be identified either manually or automatically (based on interactions). The groups may be adjusted based on one or more conditions of the network, for example control devices may be reassigned so as to control IEDs closer to the control devices in low latency networks. In addition, the network devices may be organized in to overlays, or tiers, such as mission critical, non-mission critical, control and controlled elements. During operation, a network device of an example embodiment may be part of one or more groups, but only part of one overlay at a time. The network devices and corresponding ports may be dynamically configured to forward a communication packet across the industrial network based on the groups and the overlays.

The methods, devices, and logic described above may be implemented in circuitry in many different ways and in many different combinations of hardware, or both hardware and software. For example, all or parts of the system may include circuitry that includes a controller, a microprocessor, and/or an application specific integrated circuit (ASIC), or circuitry may be implemented with discrete logic or components, or a combination of other types of analog or digital circuits, combined on a single integrated circuit or distributed among multiple integrated circuits. All or part of the logic described above may be implemented as instructions for execution by circuitry that may include a processor, controller, or other processing device and may be stored in circuitry that includes a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may be circuitry that includes a storage medium and computer readable instructions stored on the medium, which when executed in an endpoint, computer system, or other device, cause the device to perform operations according to any of the description above.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be circuitry distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A network device in an industrial network, the network device comprising:
   circuitry configured as a first network port;
   circuitry configured as a second network port;
   circuitry configured as a port manager to dynamically select a first network port configuration for the first network port and a second network port configuration for the second network port based on an identifier included in received data packets, wherein the first network port configuration allocates the first network port for operation in a first tier of a network, and the second port configuration allocates the second network port for operation in a second tier of the network, the first network port configuration being common to a plurality of network ports allocated to the first tier, and the second network port configuration being common to a plurality of network ports allocated to the second tier, and the first network port configuration having different transmission parameters than the second network port configuration;
   the first network port configured to forward, over the network, first data packets for receipt by a first port of a next hop device allocated to the first network tier and utilizing the first network port configuration in response to the identifier included in the first data packets being representative of the first tier; and
   the second network port configured to forward, over the network, second data packets for receipt by a second port of the next hop device allocated to the second network tier and utilizing the second network port configuration in response to the identifier included in the second data packets being representative of the second tier.

2. The network device of claim 1, wherein the first network port configuration comprises a first throughput rate and the second network port configuration comprises a second throughput rate, the first throughput rate being different than the second throughput rate.

3. The network device of claim 1, wherein the first tier of the network is associated with transfer, over the network, of a payload of a data packet of background data, and the second tier of the network is associated with transfer, over the network, of a payload of a data packet of control signals.

4. The network device of claim 3, further comprising circuitry configured to:
   generate a control signal for another network device in the network;
   generate a second data packet having a payload comprising the control signal, and the identifier representative of the first tier;

transmit the second data packet via the first network port based on the identifier representative of the first tier;

generate a third data packet having a payload comprising background statistics corresponding to the control signal, and the identifier representative of the second tier; and transmit the third data packet via the second network port, based on the identifier representative of the second tier.

5. The network device of claim 3, wherein the first network port configuration and the second network port configuration are selectively applied to the first port and the second port based on instructions received over the network.

6. The network device of claim 1, wherein the first network port configuration and the second network port configuration are dynamically selected based on routing information associated with the next hop device.

7. The network device of claim 1, wherein the first network port configuration and the second network port configuration are dynamically selected based on membership of the network device in a group, wherein network devices in the group share network port configurations.

8. A method of communicating data packets over a control network in an industrial network, comprising:

receiving, at a network device, an instruction to forward a data packet via a first communication port;

determining, by the network device, a first communication profile to be applied to the first communication port for transmission of the data packet;

determining, by the network device, a second communication profile to be applied to a second communication port for transmission of the data packet;

configuring, by the network device, the first communication port according to the first communication profile prior to the transmission of the data packet, the first communication profile including an operation profile that allocates the first communication port to one of a plurality of network tiers, each of the network tiers having ports allocated for operation with other ports allocated to a respective network tier;

configuring, by the network device, the second communication port according to the second communication profile prior to the transmission of the data packet via the second communication port, the second communication profile including a different operation profile that allocates the second communication port to another one of the plurality of network tiers;

transmitting, by the first communication port, the data packet over the control network to one of a plurality of other ports allocated to the one of the plurality of network tiers to which the first communication port is allocated; and transmitting the data packet over the second communication port to one of a plurality of other ports allocated to the another one of the plurality of network tiers.

9. The method of claim 8, further comprising:

receiving, at the network device, identification of at least one of the first or the second communication profile from a server computer.

10. The method of claim 8, wherein at least one of the first or the second communication profile comprises settings corresponding to throughput, latency, robustness, and power usage.

11. The method of claim 8, wherein the first communication profile is associated with communication ports of a first tier of the control network and the second communication profile is associated with communication ports of a second tier of the control network, wherein the first tier is configured to transfer data at a predetermined throughput and predetermined latency and the second tier is configured to transfer data at a predetermined robustness.

12. The method of claim 8, further comprising:

extracting, at the network device, a profile identifier included in the data packet; and determining, at the network device, the first communication profile based on the profile identifier.

13. The method of claim 12, further comprising:

buffering, at the network device, the data packet in a buffer corresponding to the profile identifier;

monitoring, at the network device, a number of data packets buffered in the buffer;

configuring, at the network device, the second communication port according to the first communication profile in response to the number of data packets in the buffer being greater than a predetermined value; and transmitting, with the network device, the buffered data packets via the second communication port.

14. A non-transitory computer medium comprising instructions executable by one or more processors, the non-transitory computer medium comprising:

instructions to receive a data packet over an industrial network;

instructions to extract, from the data packet, a timestamp;

instructions to determine if a replica of the data packet was received prior to receipt of the data packet based on the timestamp; and instructions to process the data packet in response to the data packet being received first, wherein instructions to process the data packet comprise:

instructions to determine one of a plurality of network tiers to be used to forward the data packet based on a type of the data packet;

instructions to configure a communication port according to a communication profile common to a plurality of ports allocated to the one of the plurality of network tiers;

instructions to determine the communication profile to be applied to the communication port based on latency information stored in a routing table for the communication port;

instructions to adjust a configuration of the communication port to reduce latency in response to the latency information in the routing table being greater than a predetermined threshold value; and instructions to forward the data packet via the communication port to one of the plurality of ports allocated to the one of the plurality of network tiers.

15. The non-transitory computer medium of claim 14, further comprising:

instructions to determine the one of the plurality of network tiers based on an identifier included in the received data packet.

16. The non-transitory computer medium of claim 14, further comprising:

instructions to receive the communication profile from a server computer.

* * * * *